US009648315B2

(12) United States Patent
Fukazawa et al.

(10) Patent No.: US 9,648,315 B2
(45) Date of Patent: May 9, 2017

(54) IMAGE PROCESSING APPARATUS, IMAGE PROCESSING METHOD, AND COMPUTER PROGRAM FOR USER FEEDBACK BASED SELECTIVE THREE DIMENSIONAL DISPLAY OF FOCUSED OBJECTS

(75) Inventors: Ryo Fukazawa, Kanagawa (JP); Yusuke Kudo, Kanagawa (JP); Takashi Kitao, Tokyo (JP)

(73) Assignee: Sony Corporation, Tokyo (JP)

( * ) Notice: Subject to any disclaimer, the term of this patent is extended or adjusted under 35 U.S.C. 154(b) by 708 days.

(21) Appl. No.: 13/219,883

(22) Filed: Aug. 29, 2011

(65) Prior Publication Data

US 2012/0057778 A1    Mar. 8, 2012

(30) Foreign Application Priority Data

Sep. 6, 2010   (JP) ............................... P2010-198981

(51) Int. Cl.
*H04N 13/04* (2006.01)

(52) U.S. Cl.
CPC ..... *H04N 13/0456* (2013.01); *H04N 13/0452* (2013.01); *H04N 13/0484* (2013.01)

(58) Field of Classification Search
CPC ........... H04N 13/0452; H04N 13/0454; H04N 13/0456; H04N 13/0468; H04N 13/0484; G06T 15/00; G06T 19/20; G06T 2215/00; G06T 2219/016; G06T 2219/021
See application file for complete search history.

(56) References Cited

U.S. PATENT DOCUMENTS

| 6,023,277 | A | * | 2/2000 | Osaka et al. ................... 345/419 |
| 2006/0087556 | A1 | * | 4/2006 | Era ................................... 348/51 |
| 2006/0236251 | A1 | | 10/2006 | Kataoka et al. |
| 2007/0003134 | A1 | * | 1/2007 | Song et al. ..................... 382/154 |
| 2008/0106550 | A1 | * | 5/2008 | Tokumo et al. ............... 345/427 |
| 2009/0027487 | A1 | * | 1/2009 | Misawa .......................... 348/51 |
| 2009/0244258 | A1 | * | 10/2009 | Masuda et al. ................. 348/43 |
| 2010/0097445 | A1 | * | 4/2010 | Hirama et al. .................. 348/51 |
| 2011/0035707 | A1 | * | 2/2011 | Kitayama ..................... 715/848 |
| 2011/0096155 | A1 | * | 4/2011 | Choo et al. ..................... 348/58 |
| 2011/0304691 | A1 | * | 12/2011 | Newton et al. ................. 348/43 |

FOREIGN PATENT DOCUMENTS

| EP | 1781046 | 8/2005 |
| EP | 1739980 | 6/2006 |
| EP | 2284697 | 7/2010 |

(Continued)

OTHER PUBLICATIONS

Wikipedia (Aug. 2010). "Scrolling."*

(Continued)

*Primary Examiner* — Andrew W Johns
(74) *Attorney, Agent, or Firm* — Paratus Law Group, PLLC

(57) ABSTRACT

There is provided an image processing apparatus including an operation recognition unit for recognizing an operation signal for identifying a focused image among images displayed on a screen of an image display unit and an image drawing unit for drawing an image on the screen so as to display the image as a stereoscopic image or a planar image on the screen, on the basis of a recognition result provided by the operation recognition unit.

12 Claims, 13 Drawing Sheets

(56) References Cited

FOREIGN PATENT DOCUMENTS

| JP | 09-138384 | 5/1997 |
| JP | 2000-036969 | 2/2000 |
| JP | 2003-045343 | 2/2003 |
| WO | WO-2006-074266 | 7/2006 |
| WO | WO-2010/095074 | 8/2010 |

OTHER PUBLICATIONS

Surakka et al. (Jul. 2004) "Gazing and frowning as a new human-computer interaction technique." ACM Trans. on Applied Perception, vol. 1 No. 1, pp. 40-56.*
European Search Report issued Dec. 15, 2011 in Munich for corresponding European patent application No. EP 11173123.

* cited by examiner

FIG.4
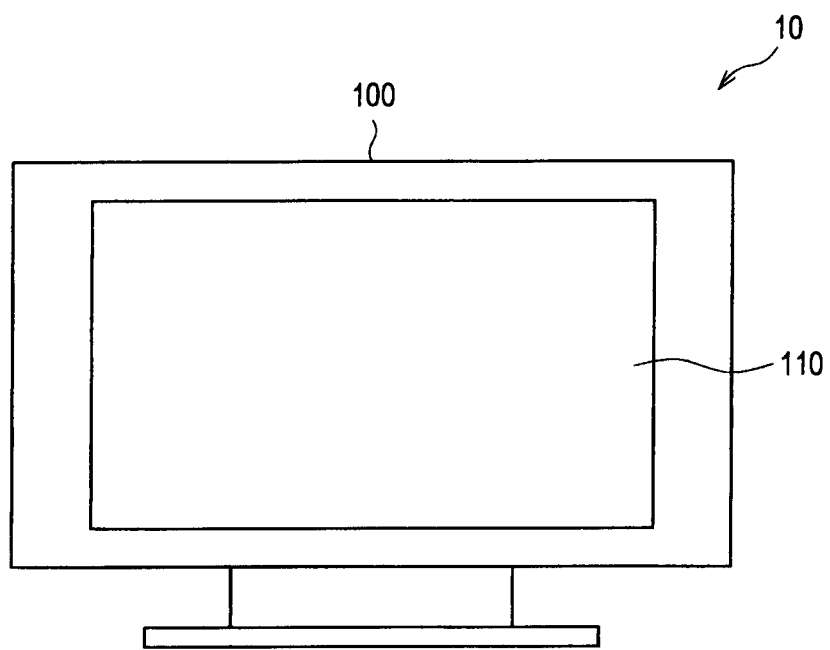
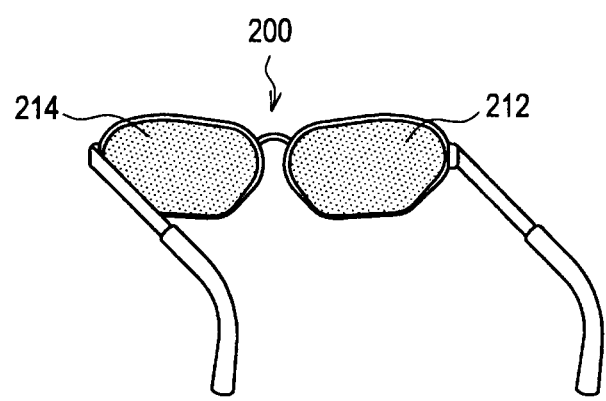

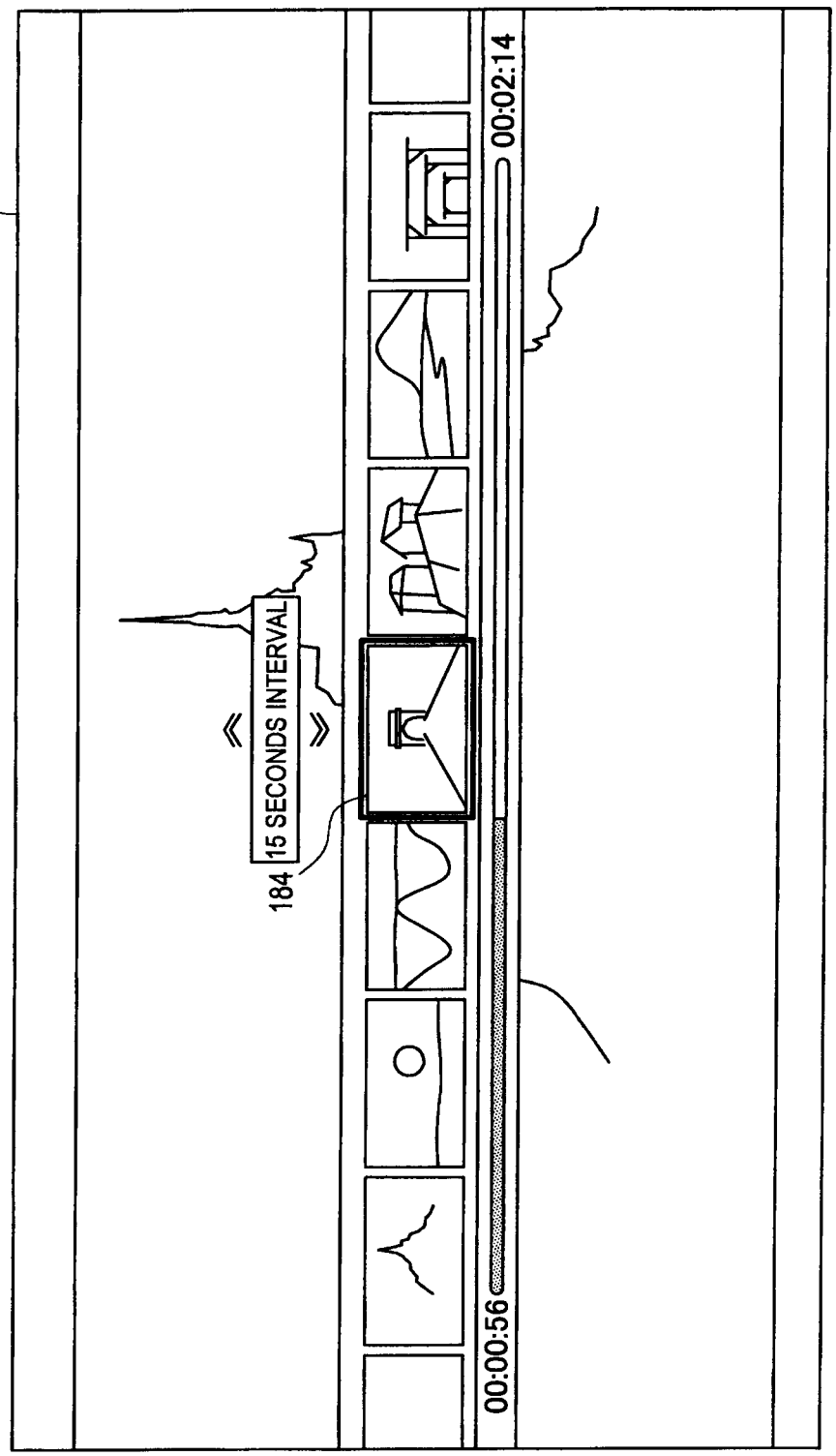

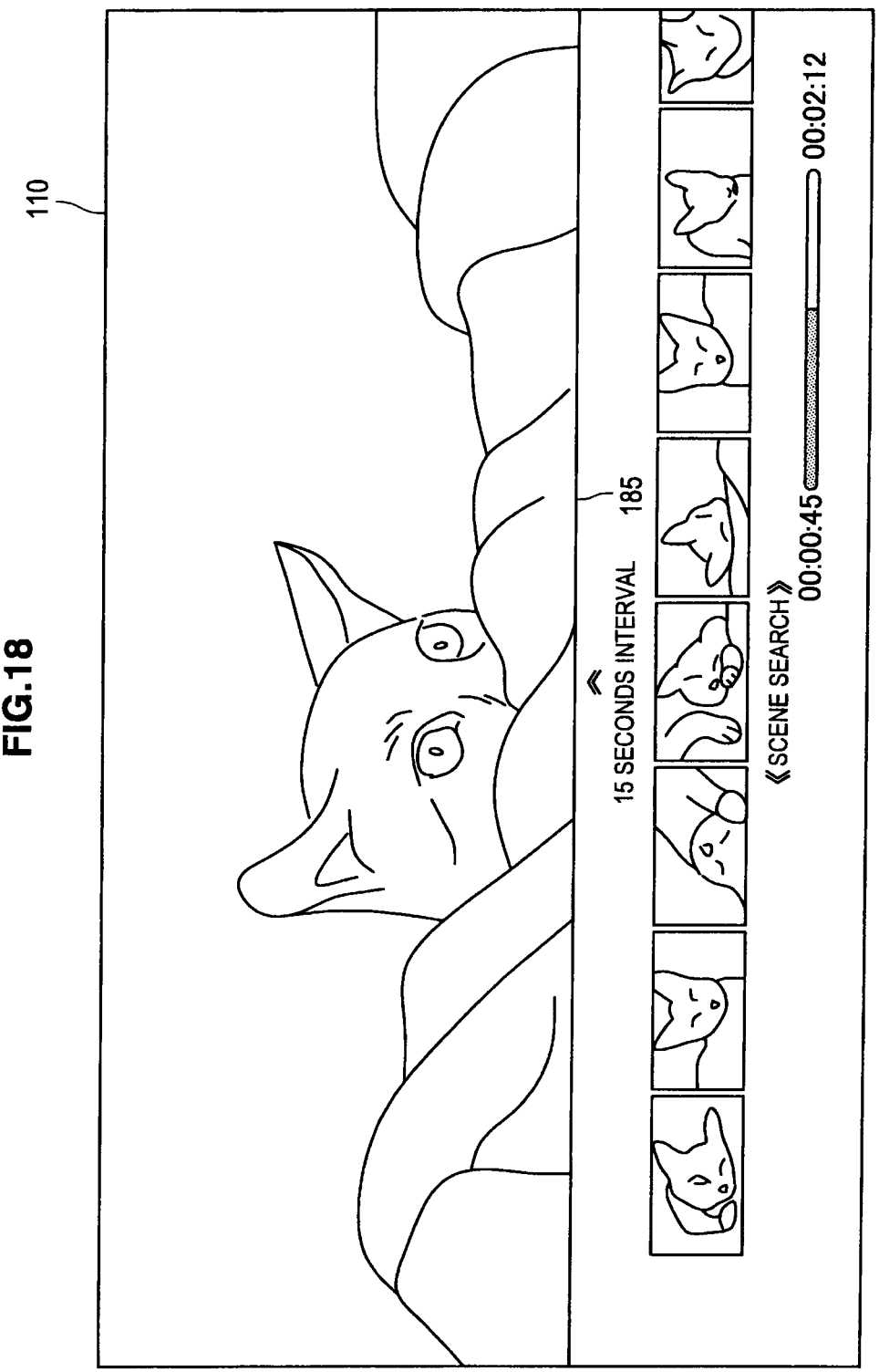

IMAGE PROCESSING APPARATUS, IMAGE PROCESSING METHOD, AND COMPUTER PROGRAM FOR USER FEEDBACK BASED SELECTIVE THREE DIMENSIONAL DISPLAY OF FOCUSED OBJECTS

BACKGROUND

The present disclosure relates to an image processing apparatus, an image processing method, and a computer program.

A time-division driven video display device is a video display device that outputs multiple video streams while sequentially switching video streams in a time-division manner. Examples of such time-division driven video display devices include a time-division stereoscopic video display system using a so-called shutter glasses (for example, see Japanese Patent Application Laid-Open Nos. 9-138384, 2000-36969, and 2003-45343) and multi-video display system using shutter glasses to allow multiple viewers to view different videos without dividing a screen.

A person extracts and combines a plurality of depth cues from a difference between two-dimensional retina videos obtained by right and left eyes (binocular parallax), thereby perceiving three-dimensional information and recognizing an object as a three-dimensional-like stereoscopic video. Rotational movements of eyeballs change a convergence angle, i.e., a crossing angle of lines of sight, and a person determines a distance from an object on the basis of the convergence angle, thus recognizing a space in a three-dimensional manner. Showing an image in a stereoscopic manner using this principle is called a stereoscopic vision. An image shown using each of images for the right and left eyes is called a stereoscopic image. A video shown by preparing a plurality of images for the right and left eyes and continuously changing the plurality of images for the right and left eyes is called a stereoscopic video. An apparatus capable of displaying the stereoscopic images and videos is called a stereoscopic video display device.

The time-division stereoscopic video display system is a video display system using a stereoscopic video display device alternately displaying a left eye video and a right eye video on the entire screen in an extremely short cycle and separately providing right and left eye videos in synchronization with the display cycle of the left eye video and the right eye video at the same time. For example, in the shutter glasses method, while the left eye video is displayed, a left eye unit of the shutter glasses passes light and the right eye unit shields light. On the other hand, while the right eye video is displayed, the right eye unit of the shutter glasses passes light and the left eye unit shields light.

A method for generating a stereoscopic image includes a method for preparing two cameras, installing one of them for the right eye and the other of them for the left eye in a horizontally displaced manner, and taking an image with a parallax. In a stereoscopic video made by computer graphics, a distance from a screen to a user and positions of right and left eyes are virtually defined, and an image rendered as if an object to be displayed is seen from the position of the right eye and an image rendered as if the object is seen from the position of the left eye are generated as two parallax images.

SUMMARY

However, since the stereoscopic image using the above binocular parallax is generated according to the above steps, a viewpoint position during generation of the image (the above camera position and the virtual viewpoint position) is limited to one point for each image as a viewpoint position that can be correctly recognized as a stereoscopic image. For the above reason, these stereoscopic images are assumed to be viewed from the front of the video display device when these stereoscopic images are displayed.

Therefore, when multiple stereoscopic images are displayed on the same screen, each displayed stereoscopic image has a viewpoint position in front of itself. This means that there are a plurality of viewpoint positions for one screen in the entire screen. This reduces the ease of view in the entire screen, and there is an issue in that higher strain is put on the eyes of the viewer.

In light of the foregoing, it is desirable to provide a novel and improved image processing apparatus, image processing method, and computer program which are capable of improving the ease of view to a viewer when a stereoscopic image is displayed.

According to an embodiment of the present disclosure, there is provided an image processing apparatus including an operation recognition unit for recognizing an operation signal for identifying a focused image among images displayed on a screen of an image display unit and an image drawing unit for drawing an image on the screen so as to display the image as a stereoscopic image or a planar image on the screen, on the basis of a recognition result provided by the operation recognition unit.

When the image drawing unit displays the focused image identified by the operation recognition unit, the image drawing unit may draw an image on the screen so as to display the image as a stereoscopic image on the screen, and when the image drawing unit displays an image other than the focused image identified by the operation recognition unit, the image drawing unit may draw an image on the screen so as to display the image as a planar image on the screen.

When a scroll speed on the screen is equal to or more than a predetermined speed as a result of recognition performed by the operation recognition unit, the image drawing unit may draw an image on the screen so as to display the image as a planar image on the screen.

When a scroll speed on the screen is not equal to or more than a predetermined speed as a result of recognition performed by the operation recognition unit, the image drawing unit may do as follows. When the image drawing unit displays the focused image identified by the operation recognition unit, the image drawing unit may draw an image on the screen so as to display the image as a stereoscopic image on the screen, and when the image drawing unit displays an image other than the focused image identified by the operation recognition unit, the image drawing unit may draw an image on the screen so as to display the image as a planar image on the screen.

The image drawing unit may draw an image on the screen so as to display the image as a stereoscopic image or a planar image on the basis of a size of an area occupied by the image in the screen.

The image drawing unit may draw an image on the screen so as to display the image as a stereoscopic image or a planar image on the basis of a distance from the image in the screen to a center of the screen.

When the image drawing unit draws an image on the screen so as to display the image as a planar image on the screen, and the image is to be displayed at a right side with respect to a center of the screen, the image drawing unit may generate a planar image using an image for the left eye among images for displaying the image as a stereoscopic image, and when the image is to be displayed at a left side with respect to the center of the screen, the image drawing unit may generate a planar image using an image for the right eye among the images for displaying the image as the stereoscopic image.

According to another embodiment of the present disclosure, there is provided an image processing method including: recognizing an operation signal for identifying a focused image among images displayed on a screen of an image display unit; and drawing an image on the screen so as to display the image as a stereoscopic image or a planar image on the screen, on the basis of a recognition result.

According to still another embodiment of the present disclosure, there is provided a computer program for causing a computer to execute: recognizing an operation signal for identifying a focused image among images displayed on a screen of an image display unit; and drawing an image on the screen so as to display the image as a stereoscopic image or a planar image on the screen, on the basis of a recognition result.

As described above, according to the present disclosure, the ease of view to a viewer can be improved when a stereoscopic image is displayed.

BRIEF DESCRIPTION OF THE DRAWINGS

FIG. 4 is an explanatory diagram schematically illustrating a configuration of a video display system according to an embodiment of the present disclosure;

FIG. 17 is an explanatory diagram illustrating a case where a screen of a scene search application is displayed on the image display unit of the display device; and FIG. 18 is an explanatory diagram illustrating a case where a screen of a scene search application is displayed on the image display unit of the display device.

DETAILED DESCRIPTION OF THE EMBODIMENT

Figure 1:
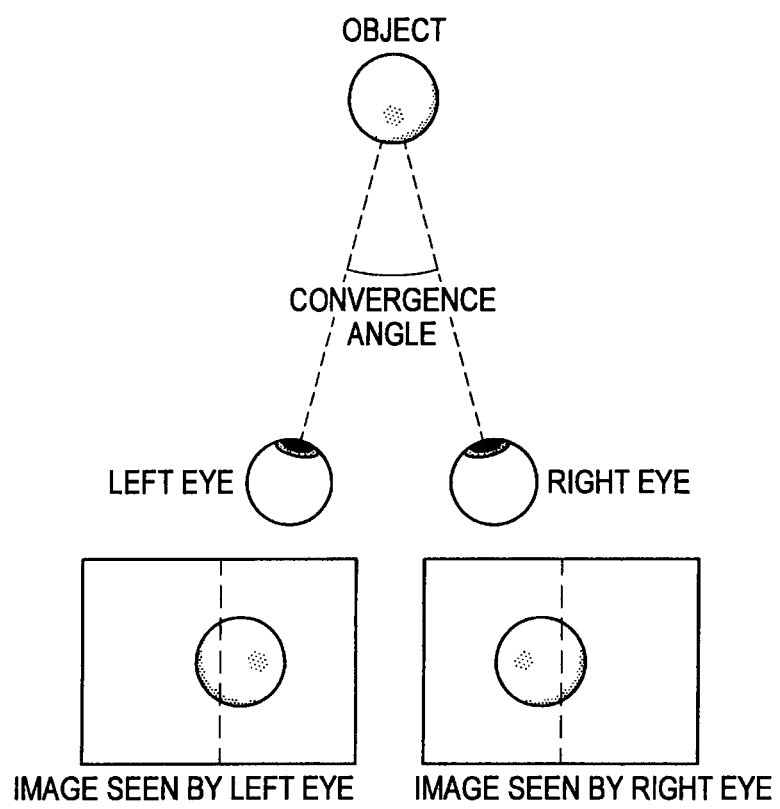
FIG. 1 is an explanatory diagram illustrating a principle of stereoscopic vision achieved by a stereoscopic display device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order listed below.

1. Principle of stereoscopic vision
2. Embodiment of the present disclosure
2-1. Configuration of video display system according to embodiment of the present disclosure
2-2. Configuration of display device according to embodiment of the present disclosure
2-3. Operation of display device according to embodiment of the present disclosure
3. Conclusion

1. PRINCIPLE OF STEREOSCOPIC VISION

First, a principle of stereoscopic vision used in a stereoscopic display device will be explained with reference to the drawings. As shown in FIG. 1, a person extracts and combines a plurality of depth cues from a difference between two-dimensional retina videos obtained by right and left eyes (binocular parallax), thereby perceiving three-dimensional information and recognizing an object as a three-dimensional-like stereoscopic video.

Figure 2:
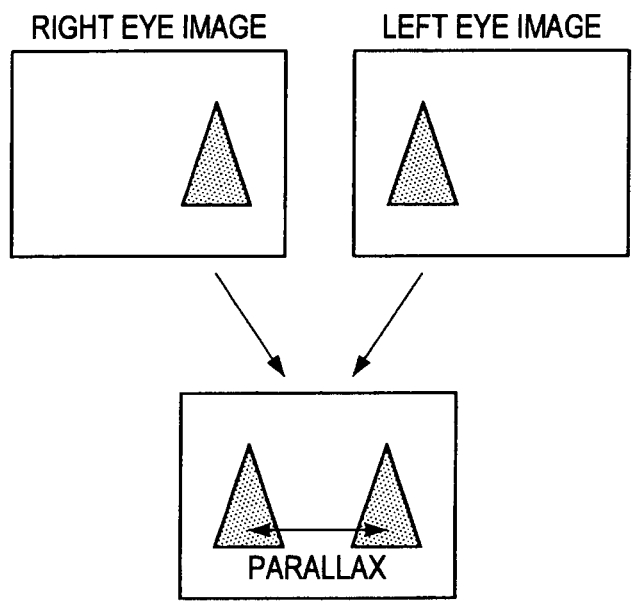
FIG. 2 is an explanatory diagram illustrating a principle of stereoscopic vision achieved by the stereoscopic display device.
Figure 3:
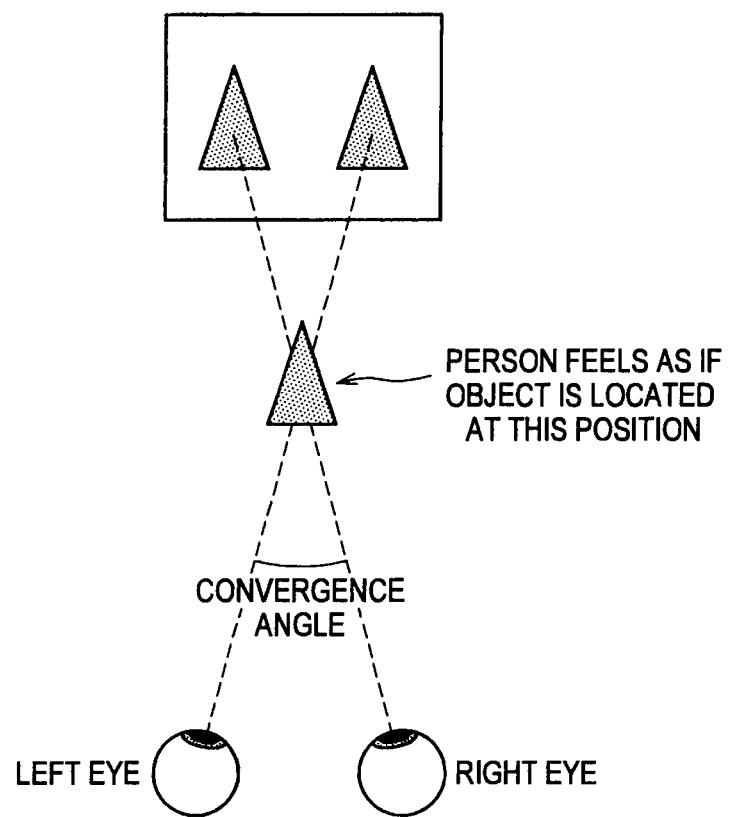
FIG. 3 is an explanatory diagram illustrating a principle of stereoscopic vision achieved by the stereoscopic display device.

Rotational movements of eyeballs change a convergence angle as shown in FIG. 1, and a person determines a distance from an object on the basis of the convergence angle, thus recognizing a space in a three-dimensional manner. As shown in FIG. 1, the convergence angle is a crossing angle of lines of sight. Using the above human nature, two planar images given with parallax for right and left eyes are prepared as shown in FIG. 2, and the planar images are separately projected onto the right and left eyes. This creates an illusion of the distance from the object as shown in FIG. 3 on the basis of the convergence angle, whereby a person can recognize the image in a stereoscopic manner. The parallax is the amount of displacement between the images for the right and left eyes as shown in FIG. 2. Using this principle, the image can be shown in a stereoscopic manner.

2. EMBODIMENT OF THE PRESENT DISCLOSURE

2-1. Configuration of Video Display System According to Embodiment of the Present Disclosure First, a configuration of a video display system 10 according to an embodiment of the present disclosure will be explained. FIG. 4 is an explanatory diagram schematically illustrating a configuration of the video display system 10 according to the present embodiment. FIG. 4 also shows a display device 100 and a pair of shutter glasses 200 that is used when a viewer perceives an image displayed on the display device 100 as a stereoscopic image. The video display system 10 is constituted by the display device 100 and the shutter glasses 200.

The display device 100 shown in FIG. 4 includes an image display unit 110 for displaying an image. The display device 100 is a device that can display not only a normal image on the image display unit 110 but also a stereoscopic image perceived as a stereoscopic image by a viewer on the image display unit 110.

Although the configuration of the image display unit 110 will be explained later in detail, the configuration of the image display unit 110 is briefly explained here. The image display unit 110 includes a light source, a liquid crystal panel, and a pair of polarization plates provided to sandwich the liquid crystal panel. A light emitted by the light source is passed through the liquid crystal panel and the polarization plate to be converted into a light polarized in a predetermined direction.

The shutter glasses 200 include a right eye image transmission unit 212 and a left eye image transmission unit 214, which are made of, for example, liquid crystal shutters. The shutter glasses 200 perform opening and closing operations of the right eye image transmission unit 212 and the left eye image transmission unit 214 each made of the liquid crystal shutter, in response to a signal transmitted from the display device 100. The opening and closing operations performed by the right eye image transmission unit 212 and the left eye image transmission unit 214 are executed by a shutter control unit 130 explained later. The viewer can perceive an image displayed on the image display unit 110 as a stereoscopic image, by looking at the light emitted from the image display unit 110 through the right eye image transmission unit 212 and the left eye image transmission unit 214 of the shutter glasses 200.

On the other hand, when a normal image is displayed on the image display unit 110, the viewer can perceive the image as the normal image by seeing the light output from the image display unit 110 as it is.

In FIG. 4, the display device 100 is shown as a television receiver, but it should be understood that the shape of the display device is not limited to such an example in the present disclosure. For example, the display device according to the present disclosure may be, for example, a monitor that is used by being connected to another electronic device such as a personal computer or the like, or it may be a mobile game machine, a mobile telephone, or a portable music playback device.

Figure 5:
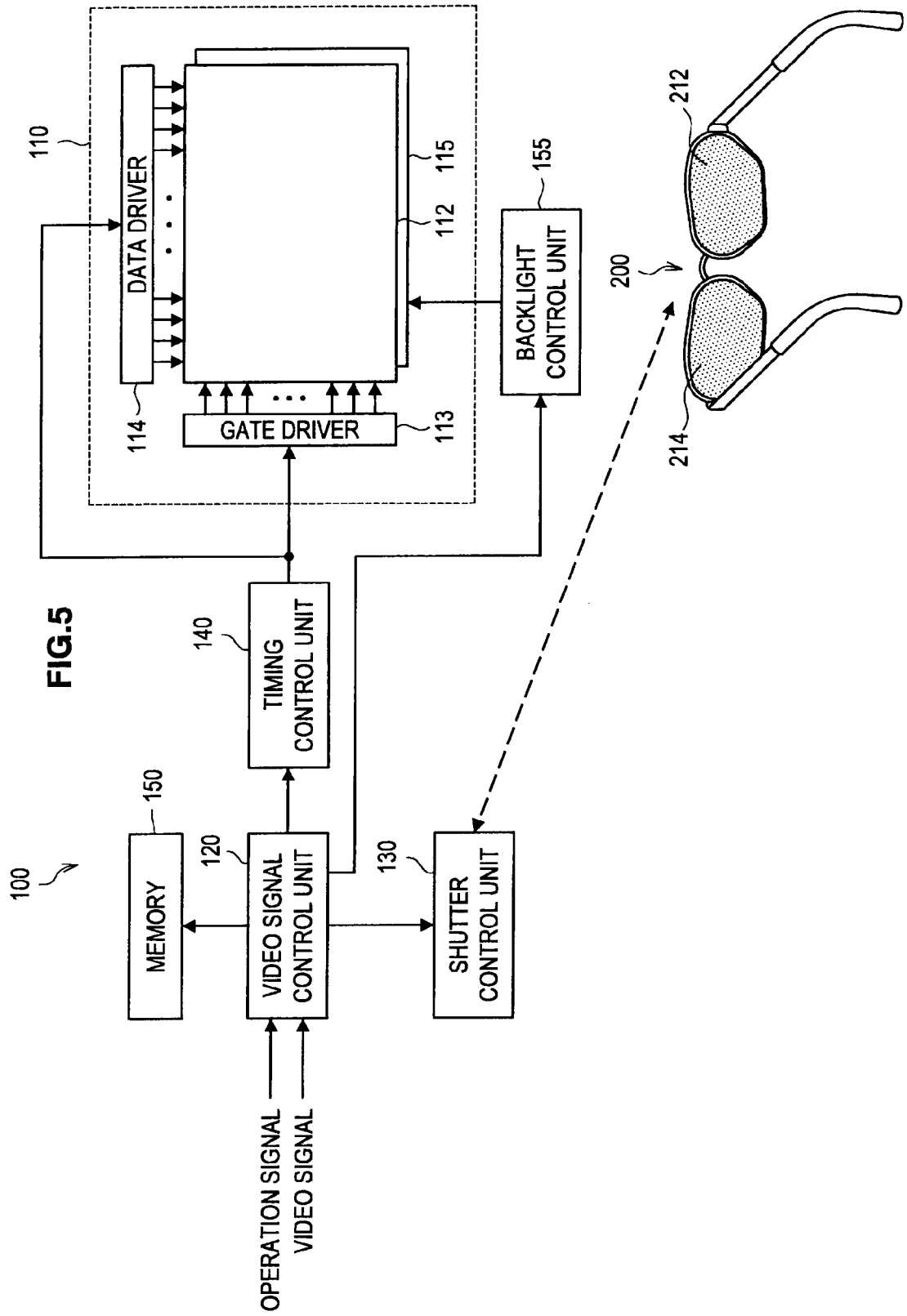
FIG. 5 is an explanatory diagram schematically illustrating a configuration of a display device according to the present embodiment.

2-2. Configuration of Display Device According to Embodiment of the Present Disclosure Subsequently, the configuration of the display device 100 according to the embodiment of the present disclosure will be explained. FIG. 5 is an explanatory diagram schematically illustrating the configuration of the display device 100 according to the present embodiment.

As shown in FIG. 5, the display device 100 according to the present embodiment includes an image display unit 110, a video signal control unit 120, a shutter control unit 130, a timing control unit 140, a memory 150, and a backlight control unit 155.

The image display unit 110 displays images in the manner described above, and when a signal is applied from an external source, images are displayed in accordance with the applied signal. The image display unit 110 includes a display panel 112, a gate driver 113, a data driver 114, and a backlight 115.

The display panel 112 displays images in accordance with the signal applied from an external source. The display panel 112 displays images by sequentially scanning a plurality of scanning lines. Liquid crystal molecules having a predetermined orientation are filled in a space between transparent plates, made of glass or the like, of the display panel 112. A drive system of the display panel 112 may be a twisted nematic (TN) system, a vertical alignment (VA) system, or an in-place-switching (IPS) system. In the following explanation, the drive system of the display panel 112 is the VA system, unless otherwise specified, but it is to be understood that the present disclosure is not limited to this example. It should be noted that the display panel 112 according to the present embodiment is a display panel that can rewrite the screen at a high-speed frame rate (120 Hz or 240 Hz, for example). In the present embodiment, an image for the right eye and an image for the left eye are displayed alternately on the display panel 112 with a predetermined timing, thereby causing the viewer to perceive a stereoscopic image.

The gate driver 113 is a driver that drives a gate bus line (not shown in the figures) of the display panel 112. A signal is transmitted from the timing control unit 140 to the gate driver 113, and the gate driver 113 outputs a signal to the gate bus line in accordance with the signal transmitted from the timing control unit 140.

The data driver 114 is a driver that generates a signal that is applied to a data line (not shown in the figures) of the display panel 112. A signal is transmitted from the timing control unit 140 to the data driver 114. The data driver 114 generates a signal to be applied to the data line, in accordance with the signal transmitted from the timing control unit 140, and outputs the generated signal.

The backlight 115 is provided on the furthermost side of the image display unit 110 as seen from the side of the viewer. When an image is displayed on the image display unit 110, white light that is not polarized (unpolarized light) is output from the backlight 115 to the display panel 112 positioned on the side of the viewer. The backlight 115 may use a light-emitting diode, for example, or may use a cold cathode tube. It should be noted that the backlight 115 shown in FIG. 5 is a surface light source, but the present disclosure is not limited to such an example. For example, the light source may be arranged around the peripheral portions of the display panel 112, and may output light to the display panel 112 by diffusing the light from the light source using a diffuser panel and the like. Alternatively, for example, a point light source and a condenser lens may be used in combination in place of the surface light source.

When the video signal control unit 120 receives a video signal an operation signal for identifying a focused image from an external source outside of the video signal control unit 120, the video signal control unit 120 executes various kinds of signal processing on the received video signal on the basis of the recognition result of the received operation signal so that the video signal becomes suitable for displaying a stereoscopic image or a planar image in the image display unit 110, and outputs the processed video signal. The operation signal for identifying a focused image will be explained later in detail. The video signal processed by the video signal control unit 120 is transmitted to the timing control unit 140. When the video signal control unit 120 executes the signal processing, the video signal control unit 120 transmits a predetermined signal to the shutter control unit 130 in accordance with the signal processing. Examples of signal processings performed by the video signal control unit 120 include the following processings.

When a video signal to display the image for the right eye on the image display unit 110 (a right eye video signal), a video signal to display the image for the left eye on the image display unit 110 (a left eye video signal), and an operation signal for identifying a focused image are received by the video signal control unit 120, a determination is made as to whether the image is to be displayed as a stereoscopic image or not based on a result of recognition of the received operation signal. When the image is to be displayed as a stereoscopic image, the video signal control unit 120 generates, from the two received video signals, a video signal for a stereoscopic image. In the present embodiment, the video signal control unit 120 generates, from the received right eye video signal and the left eye video signal, video signals to display images on the display panel 112 in the following order in a time-division manner: image for the right eye, image for the left eye, image for the right eye, image for the left eye, and so on. In some cases, a plurality of frames for image for the left eyes and a plurality of frames for image for the right eyes are repeatedly displayed. In such a case, for example, the video signal control unit 120 generates video signals to display images in the following order: image for the right eye, image for the right eye, image for the left eye, image for the left eye, image for the right eye, image for the right eye and so on.

On the other hand, when a video signal to display the image for the right eye on the image display unit 110 (a right eye video signal), a video signal to display the image for the left eye on the image display unit 110 (a left eye video signal), and an operation signal for identifying a focused image are received by the video signal control unit 120, a determination is made as to whether the image is to be displayed as a stereoscopic image or not based on a result of recognition of the received operation signal. When the image is not to be displayed as a stereoscopic image, i.e., when the image is to be displayed as a planar image, the video signal control unit 120 generates, from at least one of the two received video signals, a video signal for a planar image as explained later.

The shutter control unit 130 receives the predetermined signal that is generated in accordance with the signal processing performed by the video signal control unit 120, and generates a shutter control signal that controls shutter operation of the shutter glasses 200 in accordance with the predetermined signal. The shutter glasses 200 perform opening and closing operations of the right eye image transmission unit 212 and the left eye image transmission unit 214, on the basis of the shutter control signal that is generated by the shutter control unit 130 and transmitted wirelessly based on, for example, IEEE802.15.4. The backlight control unit 155 receives a predetermined signal generated based on the signal processing performed by the video signal control unit 120, and generates a backlight control signal for controlling lighting operation of the backlight according to the signal.

In accordance with the signal transmitted from the video signal control unit 120, the timing control unit 140 generates a pulse signal that is used to operate the gate driver 113 and the data driver 114. When the pulse signal is generated by the timing control unit 140, and the gate driver 113 and the data driver 114 receive the pulse signal generated by the timing control unit 140, an image corresponding to the signal transmitted from the video signal control unit 120 is displayed on the display panel 112.

The memory 150 stores various kinds of settings of the display device 100, computer programs for operating the display device 100, and the like.

Figure 6:
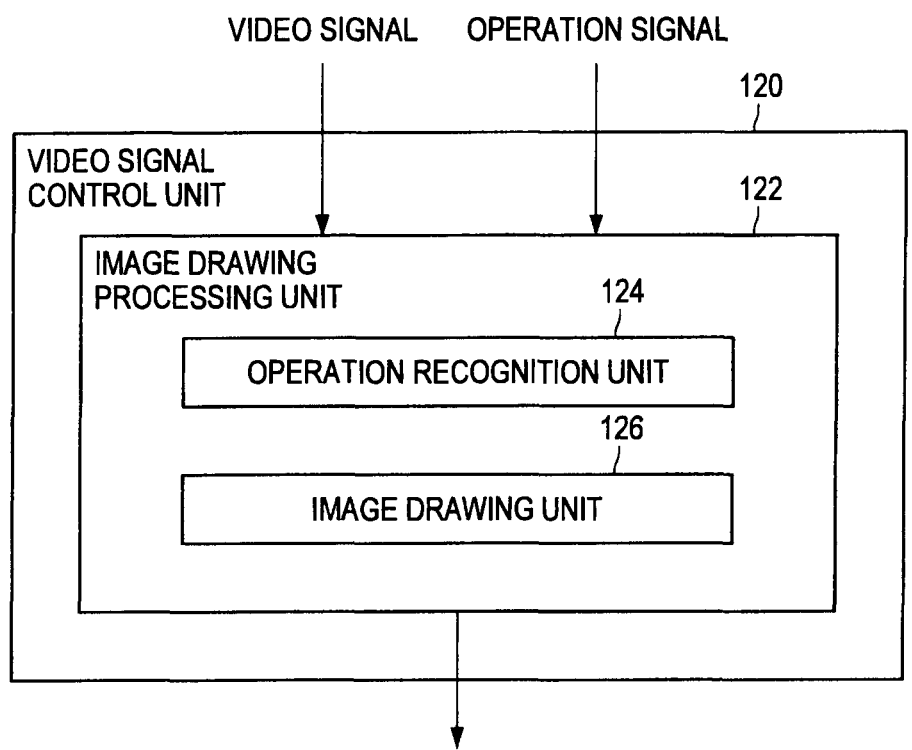
FIG. 6 is a block diagram illustrating a functional configuration of a video signal control unit in the display device according to the present embodiment.

Subsequently, a functional configuration of the video signal control unit 120 in the display device 100 according to the embodiment of the present disclosure will be explained. FIG. 6 is a block diagram illustrating the functional configuration of the video signal control unit 120 in the display device 100 according to the present embodiment.

In FIG. 6, the video signal control unit 120 includes an image drawing processing unit 122 for executing image drawing processing for displaying a stereoscopic image or a planar image on the image display unit 110. Further, the image drawing processing unit 122 includes an operation recognition unit 124 and an image drawing unit 126.

The operation recognition unit 124 is adapted to recognize an operation signal for identifying a focused image, transmitted to the video signal control unit 120, selected from among images displayed on the screen of the image display unit 110. The operation signal is a signal representing operation and the like performed by a viewer when a plurality of images are displayed on the image display unit 110. Examples of the operation signals include a signal representing selection using arrow keys of a remote controller (not shown) and the like, a signal representing selection (click) using a pointer of a mouse (not shown), and a signal representing selection (mouse over) made at a position of a pointer of a mouse and the like. Further, another example of operation signal includes a signal representing head tracking and eye tracking of a viewer. The operation recognition unit 124 recognizes the operation signal and identifies a focused image selected from among images displayed on the screen of the image display unit 110.

The image drawing unit 126 draws an image which is to be displayed on the image display unit 110 as a stereoscopic image or a planar image, on the basis of the recognition result of the operation signal recognized by the operation recognition unit 124.

When the image drawing unit 126 receives a video signal to display the image for the right eye on the image display unit 110 (a right eye video signal), and a video signal to display the image for the left eye on the image display unit 110 (a left eye video signal), a determination is made as to whether focus is given to the image based on a result of recognition given by the operation recognition unit 124. When focus is given to the image, the image drawing unit 126 generates, from the two received video signals, a video signal for a stereoscopic image.

On the other hand, when the image drawing unit 126 receives a video signal to display the image for the right eye on the image display unit 110 (a right eye video signal), and a video signal to display the image for the left eye on the image display unit 110 (a left eye video signal), a determination is made as to whether focus is given to the image based on a result of recognition given by the operation recognition unit 124. When focus is not given to the image, the image drawing unit 126 generates, from at least one of the two received video signals, a video signal for a planar image. For example, when focus is not given to the image, the image drawing unit 126 generates a video signal for a planar image from one of the two received video signals as defined in advance, i.e., either a right eye video signal or a left eye video signal. For example, when focus is not given to the image as a result of recognition of the operation recognition unit 124, and the image is to be displayed at the right side with respect to the center of the screen of the image display unit 110, the image drawing unit 126 generates a video signal for a planar image from the left eye video signal among the received two video signals. On the other hand, when focus is not given to the image as a result of recognition of the operation recognition unit 124, and the image is to be displayed at the left side with respect to the center of the screen of the image display unit 110, the image drawing unit 126 generates a video signal for a planar image from the right eye video signal among the received two video signals. With this process, a viewer can view an appropriate planar image. Alternatively, for example, when focus is not given to the image as a result of recognition of the operation recognition unit 124, and the image is to be displayed at the right side with respect to the center of the screen of the image display unit 110, the image drawing unit 126 generates a video signal for a planar image from the right eye video signal among the received two video signals. On the other hand, when focus is not given to the image as a result of recognition of the operation recognition unit 124, and the image is to be displayed at the left side with respect to the center of the screen of the image display unit 110, the image drawing unit 126 generates a video signal for a planar image from the left eye video signal among the received two video signals.

Figure 7:
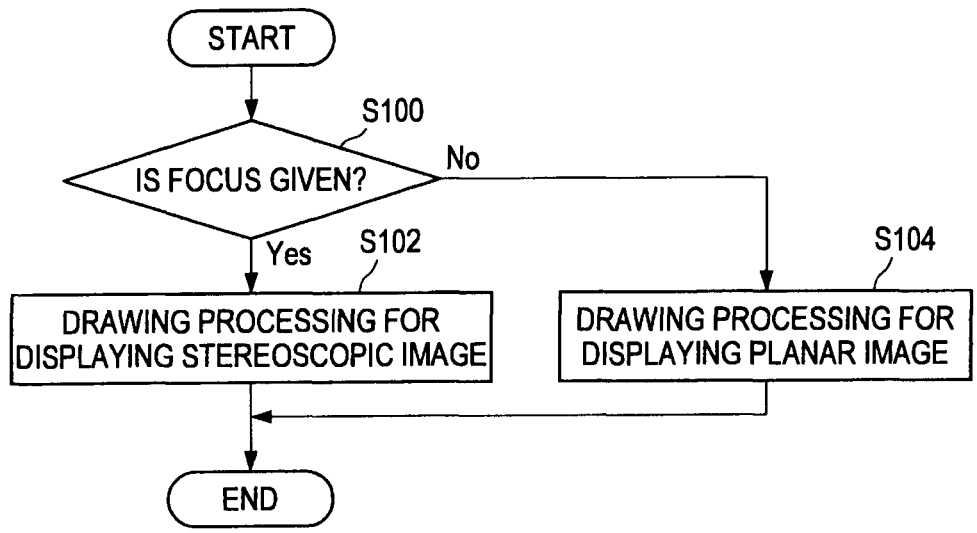
FIG. 7 is a flowchart illustrating image drawing processing executed by the display device according to the present embodiment.

2-3. Operation of Display Device According to Embodiment of the Present Disclosure Subsequently, operation of the display device 100 according to the embodiment of the present disclosure will be explained. First, image drawing processing executed by the display device 100 according to the present embodiment will be explained. FIG. 7 is a flowchart illustrating image drawing processing executed by the display device 100 according to the present embodiment.

In FIG. 7, first, when the video signal control unit 120 receives a video signal to display the image for the right eye on the image display unit 110 (a right eye video signal) and a video signal to display the image for the left eye on the image display unit 110 (a left eye video signal), the operation recognition unit 124 of the image drawing processing unit 122 recognizes an operation signal for identifying a focused image received by the video signal control unit 120, and determines whether focus is given to the image or not (step S100).

When focus is given to the image as a result of the determination in step S100 (YES in step S100), the image drawing unit 126 of the image drawing processing unit 122 draws an image so as to display a stereoscopic image on the image display unit 110 (step S102), and then this processing is terminated.

When focus is not given to the image as a result of the determination in step S100 (NO in step S100), the image drawing unit 126 of the image drawing processing unit 122 draws an image so as to display a planar image on the image display unit 110 (step S104), and then this processing is terminated.

Figure 8:
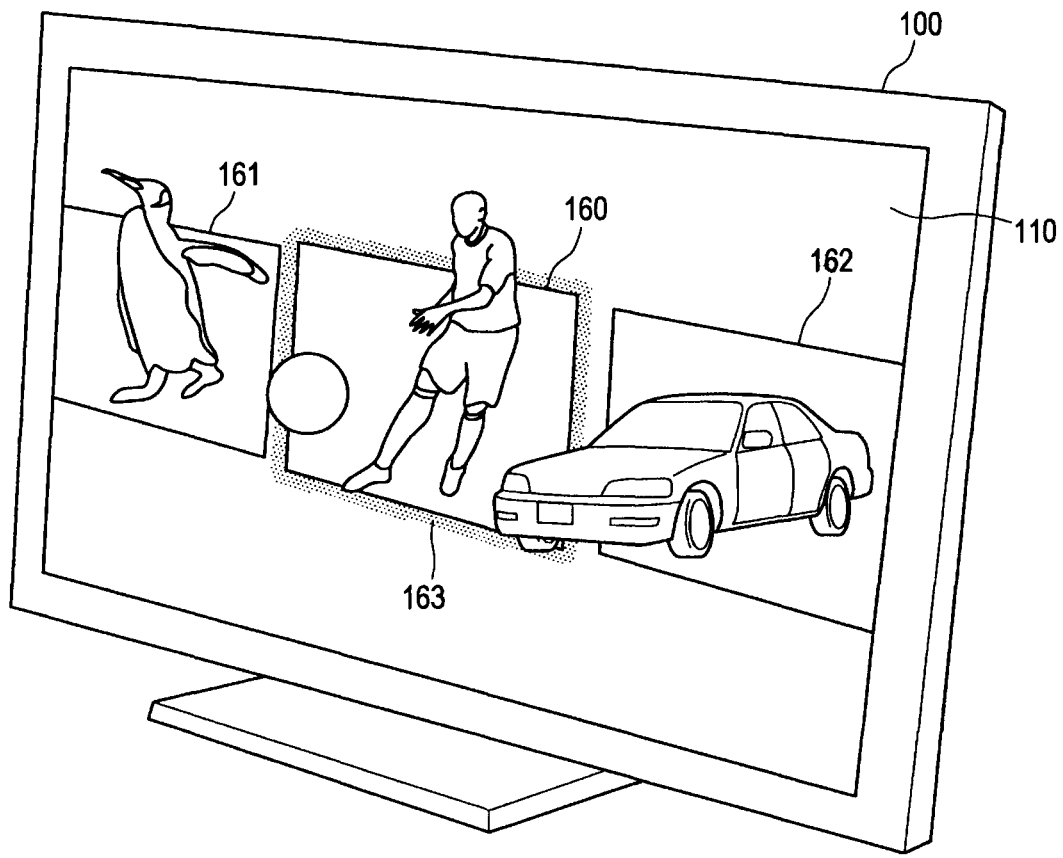
FIG. 8 is an explanatory diagram illustrating a case where a plurality of stereoscopic images are displayed on an image display unit of the display device.
Figure 9:
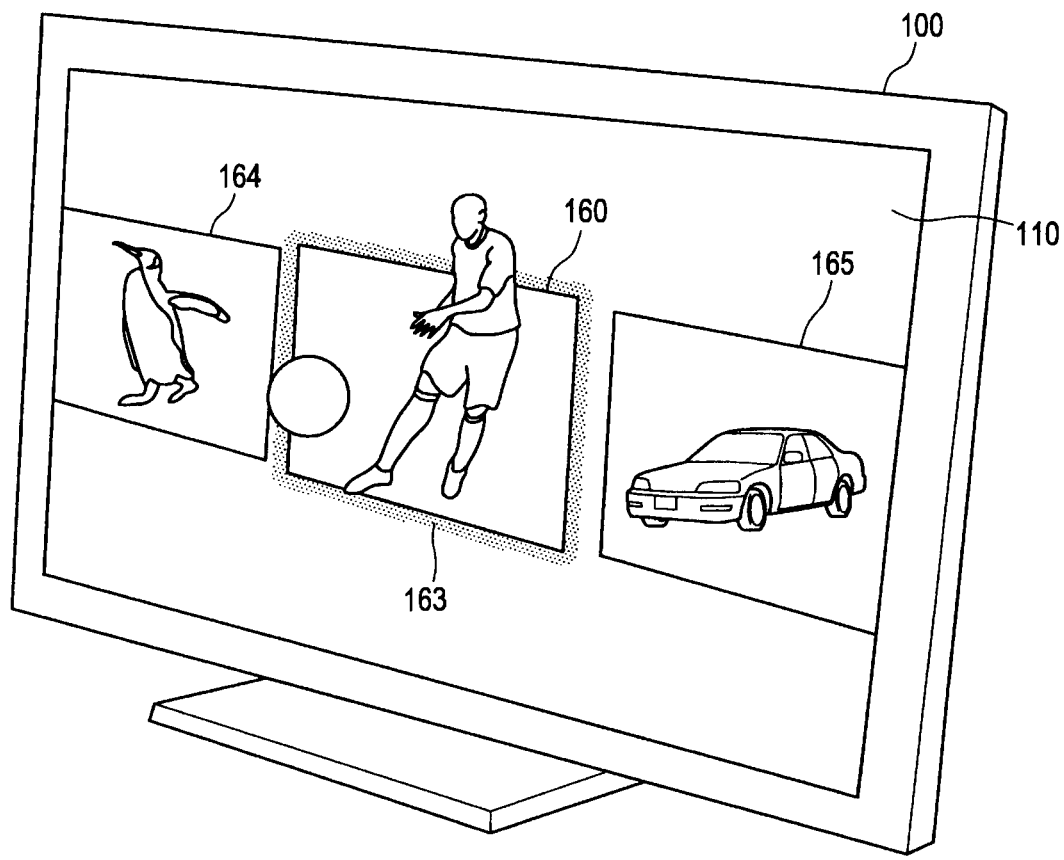
FIG. 9 is an explanatory diagram illustrating a case where only a stereoscopic image to which focus is given in the image display unit of the display device is displayed as a stereoscopic image.

According to the image drawing processing of FIG. 7, a focused image is displayed as a stereoscopic image and a non-focused image is displayed as a planar image on the image display unit 110. For example, as shown in FIG. 8, when a plurality of stereoscopic images 160, 161, 162 are displayed on the image display unit 110 of the display device 100, each of the displayed stereoscopic images 160, 161, 162 has a viewpoint position in front of itself. This means that there are a plurality of viewpoint positions for one screen in the entire screen. This reduces the ease of view in the entire screen, and higher strain is put on the eyes of the viewer. On the other hand, for example, as shown in FIG. 9, when only a stereoscopic image 160 selected by operation performed by a viewer and the like with a frame 163, i.e., only a focused stereoscopic image 160, is displayed as a stereoscopic image on the image display unit 110 of the display device 100, planar images 164, 165 are displayed as planar images instead of stereoscopic images 161, 162, a plurality of viewpoint positions do not exist for one screen, and there is only one viewpoint position. This improves the ease of view to a viewer.

In FIG. 9, for example, when the frame 163 is moved to the planar image 165 by operation performed by a viewer and the like so that the planar image 165 is selected, i.e., focused, the stereoscopic image 162 is displayed instead of the planar image 165, and a planar image (not shown) corresponding to the stereoscopic image 160 is displayed instead of the stereoscopic image 160.

Figure 10:
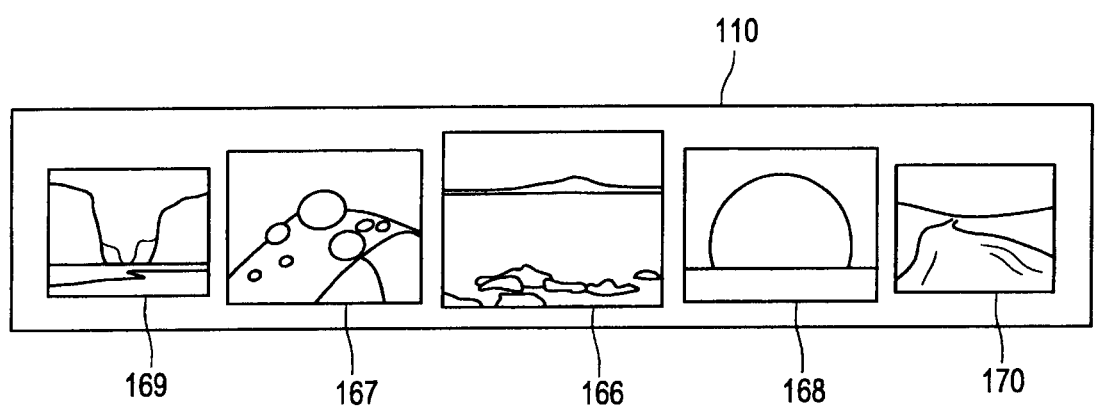
FIG. 10 is an explanatory diagram illustrating a case where a screen of the image display unit is viewed from the front.

FIGS. 10 to 15 are explanatory diagrams illustrating a case where a plurality of stereoscopic images 166, 167, 168, 169, 170 are displayed on the screen of the image display unit 110. FIG. 10 is an explanatory diagram illustrating a case where a screen of the image display unit 110 is viewed from the front. FIGS. 11 to 15 are schematic diagrams for illustrating a case where a stereoscopic image is viewed from above the image display unit 110 in order to explain a stereoscopic image displayed on the screen of the image display unit 110.

In FIG. 10, stereoscopic images 166, 167, 168, 169, 170 of a plurality of different image sizes are displayed on the screen of the image display unit 110. As shown in FIG. 10, the image size of the stereoscopic image 166 located at a position close to the center of the screen is larger than those of the other stereoscopic images 167, 168, 169, 170, and the image size of the stereoscopic images 169, 170 located at positions far from the center of the screen is smaller than those of the other stereoscopic images 166, 167, 168. Accordingly, as shown in FIG. 11, the viewer perceives as if the stereoscopic image 166 is displayed at a position closer to the viewer than the other stereoscopic images 167, 168, 169, 170, and the stereoscopic images 169, 170 are displayed at positions farther from the viewer than the other stereoscopic images 166, 167, 168.

Figure 11:
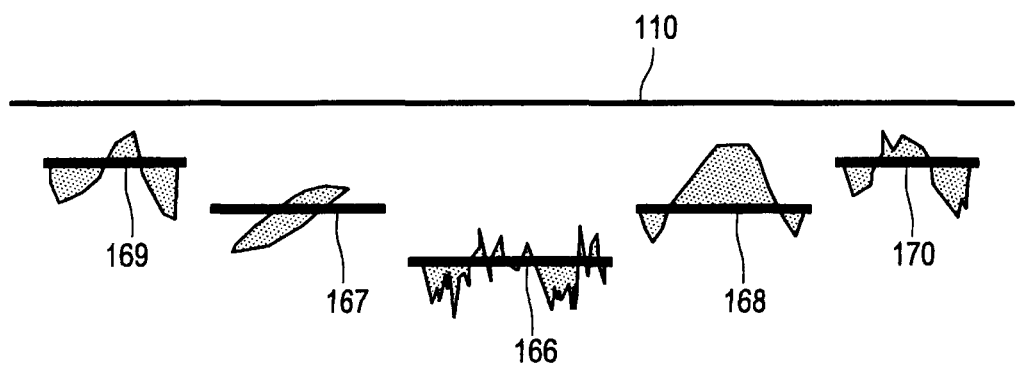
FIG. 11 is a schematic diagram for illustrating a case where a stereoscopic image is viewed from above the image display unit in order to explain a stereoscopic image displayed on the screen of the image display unit.
Figure 12:
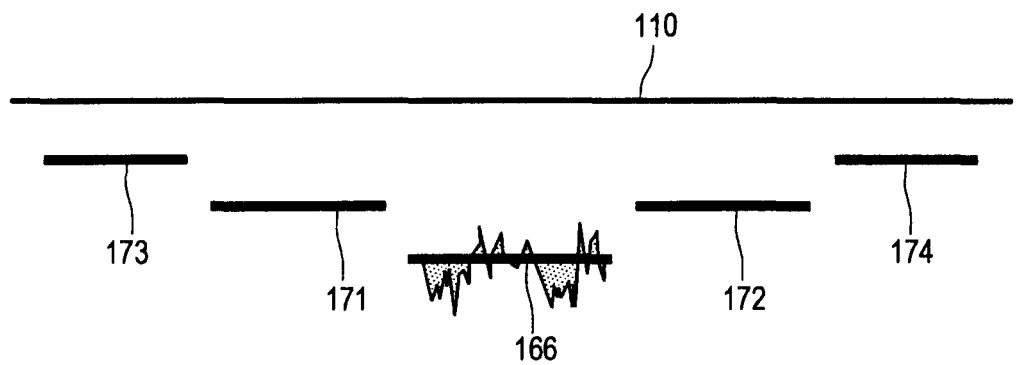
FIG. 12 is a schematic diagram for illustrating a case where a stereoscopic image is viewed from above the image display unit in order to explain a stereoscopic image displayed on the screen of the image display unit.

In FIGS. 10 and 11, like FIG. 12, only the stereoscopic image 166, i.e., the focused image, is displayed as the stereoscopic image, and the stereoscopic images 167, 168, 169, 170, i.e., the non-focused images, are displayed as planar images 171, 172, 173, 174 instead of the stereoscopic images 167, 168, 169, 170, whereby this improves the ease of view to the viewer as described above.

Figure 13:
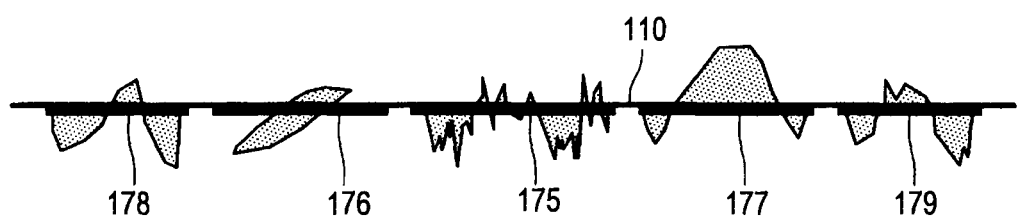
FIG. 13 is a schematic diagram for illustrating a case where a stereoscopic image is viewed from above the image display unit in order to explain a stereoscopic image displayed on the screen of the image display unit.
Figure 14:
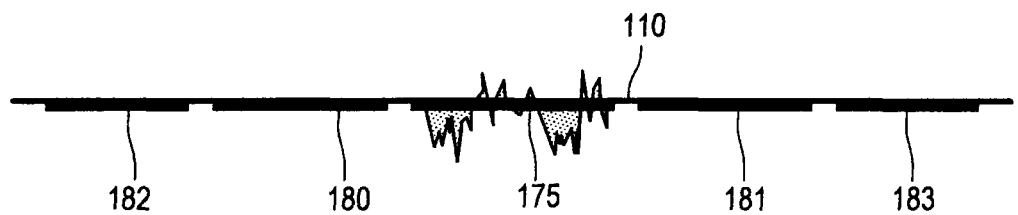
FIG. 14 is a schematic diagram for illustrating a case where a stereoscopic image is viewed from above the image display unit in order to explain a stereoscopic image displayed on the screen of the image display unit.

In FIGS. 10 to 12, the plurality of images of different image sizes are displayed on the screen of the image display unit 110. Likewise, the ease of view to the viewer can be improved even when, as shown in FIG. 13, a plurality of stereoscopic images 175, 176, 177, 178, 179 of the same image size are displayed on the screen of the image display unit 110. In other words, as shown in FIG. 14, only the stereoscopic image 175, i.e., the focused image, is displayed as the stereoscopic image, and the stereoscopic images 176, 177, 178, 179, i.e., the non-focused images, are displayed as planar images 180, 181, 182, 183 instead of the stereoscopic images 176, 177, 178, 179, whereby this improves the ease of view to the viewer as described above.

Figure 15:
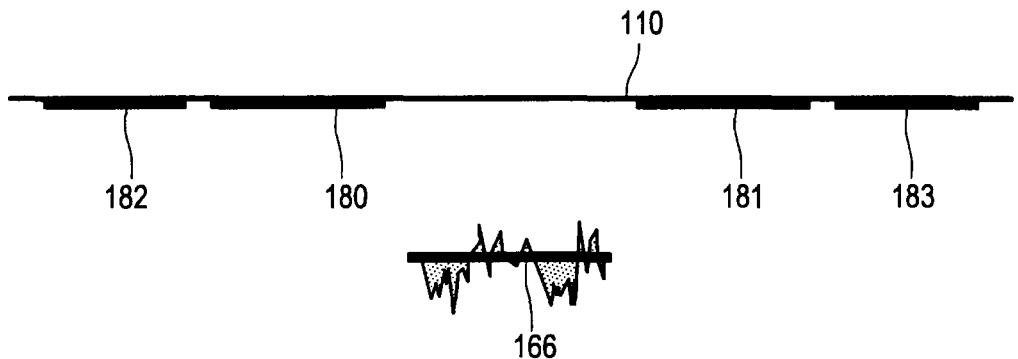
FIG. 15 is a schematic diagram for illustrating a case where a stereoscopic image is viewed from above the image display unit in order to explain a stereoscopic image displayed on the screen of the image display unit.

As shown in FIG. 15, the image size of the stereoscopic image 166 located at a position close to the center of the screen is larger than those of the other stereoscopic images (not shown). Likewise, the ease of view to the viewer can be improved even when the viewer is caused to perceive as if the stereoscopic image 166 is displayed at a position closer to the viewer than the other stereoscopic images (not shown). In other words, as shown in FIG. 15, only the stereoscopic image 166, i.e., the focused image, is displayed as the stereoscopic image, and the stereoscopic images (not shown), i.e., the non-focused images, are displayed as planar images 180, 181, 182, 183 instead of the stereoscopic images (not shown), whereby this improves the ease of view to the viewer as described above.

Figure 16:
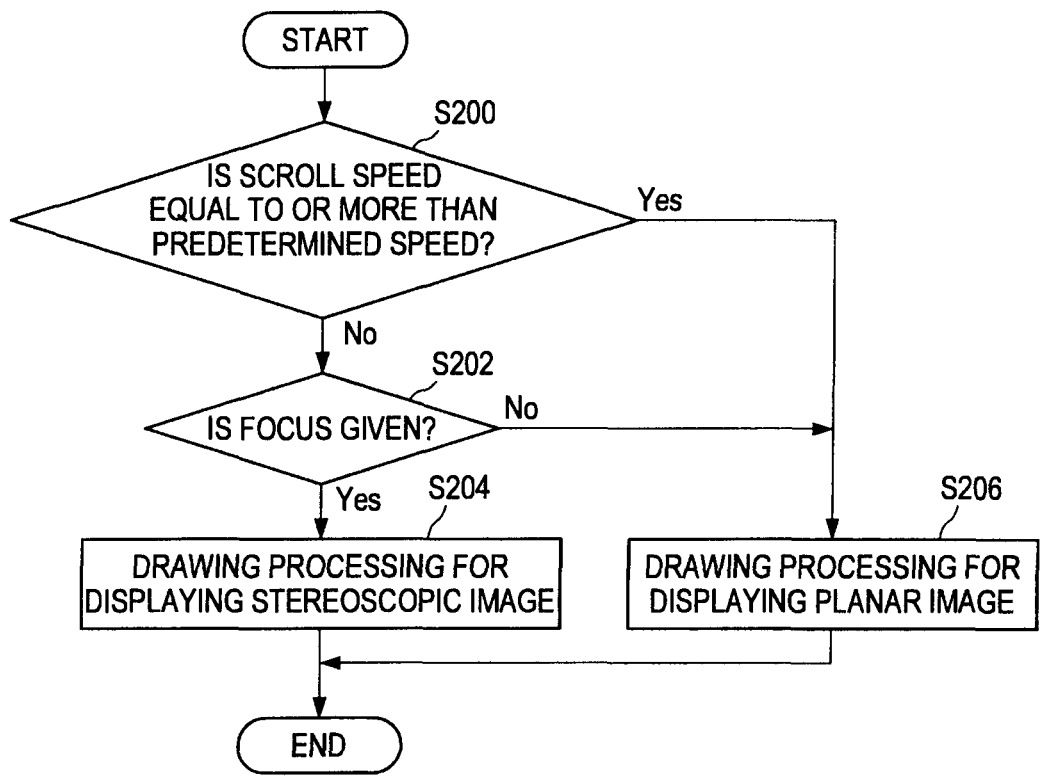
FIG. 16 is a flowchart illustrating another image drawing processing executed by the display device according to the present embodiment.

Subsequently, another image drawing processing executed by the display device 100 according to the present embodiment will be explained. FIG. 16 is a flowchart illustrating another image drawing processing executed by the display device 100 according to the present embodiment.

In FIG. 16, first, when the video signal control unit 120 receives a video signal to display the image for the right eye on the image display unit 110 (a right eye video signal) and a video signal to display the image for the left eye on the image display unit 110 (a left eye video signal), the operation recognition unit 124 of the image drawing processing unit 122 recognizes an operation signal for identifying a focused image received by the video signal control unit 120, and determines whether a scroll speed in the screen of the image display unit 110 is equal to or more than a predetermined speed or not (step S200).

When the scroll speed is determined not to be equal to or more than the predetermined speed as a result of the determination in step S200 (NO in step S200), the operation recognition unit 124 of the image drawing processing unit 122 recognizes the operation signal for identifying the focused image received by the video signal control unit 120, and determines whether focus is given to the image or not (step S202).

When focus is given to the image as a result of the determination in step S202 (YES in step S202), the image drawing unit 126 of the image drawing processing unit 122 draws an image so as to display a stereoscopic image on the image display unit 110 (step S204), and then this processing is terminated.

When the scroll speed is determined to be equal to or more than the predetermined speed as a result of the determination in step S200 (YES in step S200), or focus is not given to the image as a result of the determination in step S202 (NO in step S202), the image drawing unit 126 of the image drawing processing unit 122 draws an image so as to display a planar image on the image display unit 110 (step S206), and then this processing is terminated.

According to the another image drawing processing of FIG. 16, when the scroll speed is equal to or more than the predetermined speed on the screen of the image display unit 110, all the images are displayed as planar images, and when the scroll speed is not equal to or more than the predetermined speed, the focused image is displayed as the stereoscopic image, and the non-focused image is displayed as the planar image. For example, as shown in FIG. 17, when, for example, a screen of a scene search application is displayed on the image display unit 110 of the display device 100, and the scroll speed of operation performed by a viewer is equal to or more than a predetermined speed, the ease of view in the entire screen is reduced if a focused image 184 is displayed as a stereoscopic image. This may further increase the strain put on the eyes of the viewer. For this reason, when the scroll speed is equal to or more than the predetermined speed, all the images are displayed as planar images, so that this improves the ease of view to the viewer and reduces the strain put on the eyes of the viewer. On the other hand, when the scroll speed is not equal to or more than the predetermined speed, the ease of view in the entire screen is not reduced even if a focused image 184 is displayed as a stereoscopic image, and this does not increase the strain put on the eyes of the viewer. Therefore, in this case, the focused image 184 is displayed as a stereoscopic image, so that the viewer sees the stereoscopic image.

In the present embodiment as described above, the operation signal for identifying the focused image is recognized to determine whether focus is given to the image, and only the focused image is displayed as a stereoscopic image. Alternatively, as shown in FIG. 18, a determination as to whether an image is to be displayed as a stereoscopic image or not may be made on the basis of the size of area occupied by the image in the screen of the image display unit 110. For example, an image 185 occupying the largest area in the screen of the image display unit 110 may be displayed as a stereoscopic image.

In the present embodiment as described above, the operation signal for identifying the focused image is recognized to determine whether focus is given to the image, and only the focused image is displayed as a stereoscopic image. Alternatively, as shown in FIG. 18, a determination as to whether an image is to be displayed as a stereoscopic image or not may be made on the basis of the magnitude of a distance from the image to the center of the screen in the screen of the image display unit 110. For example, an image 185 at a position having the smallest distance from the center, i.e., located closest to the center, in the screen of the image display unit 110 may be displayed as a stereoscopic image.

3. CONCLUSION

As described above, the display device 100 according to the embodiment of the present disclosure recognizes the operation signal for identifying the focused image of the images displayed on the screen of the image display unit 110, and draws an image on the basis of the recognition result so as to display the image as a stereoscopic image or a planar image on the screen of the image display unit 110.

For example, when the display device 100 displays a focused image, the display device 100 draws an image so as to display the image as a stereoscopic image on the screen of the image display unit 110. When the display device 100 displays an image other than the focused image, the display device 100 draws an image so as to display the image as a planar image on the screen of the image display unit 110.

Therefore, the display device 100 according to an embodiment of the present disclosure can improve the ease of view to the viewer in the stereoscopic image display.

The object of the present disclosure may also be achieved by providing a recording medium storing a program code of software realizing the functions of the above embodiment to a system or an apparatus and causing a computer (or a CPU, an MPU, or the like) of the system or the apparatus to read and execute the program code stored in the recording medium.

In this case, the program code itself read from the recording medium achieves the functions of the above embodiment. Therefore, the program code and the recording medium storing the program code constitute the present disclosure.

Examples of recording media providing the program code include a floppy (registered trademark) disk, a hard disk, an magneto-optical disk, an optical disk such as a CD-ROM, a CD-R, a CD-RW, a DVD-ROM, a DVD-RAM, a DVD-RW, and a DVD+RW, a magnetic tape, a non-volatile memory card, and a ROM. Alternatively, the program code may be downloaded via a network.

The functions of the above embodiment are realized by executing the program code read by the computer. Furthermore, it is also realized by causing an OS (operating system) running on the computer to perform a part or all of actual processings on the basis of commands given by the program code. It is to be understood that the functions of the above embodiment realized by those processings are also included within the present disclosure.

Still further, the program code read from the recording medium may be written to a memory provided in a function expansion unit connected to the computer or a function expansion board inserted into the computer, and thereafter, a part or all of actual processings of the expanded functions may be performed by the expansion board, a CPU provided in the expansion unit, and the like, on the basis of the commands given by the program code. It is to be understood that the functions of the above embodiment realized by those processings are also included within the present disclosure.

It should be understood by those skilled in the art that various modifications, combinations, sub-combinations and alterations may occur depending on design requirements and other factors insofar as they are within the scope of the appended claims or the equivalents thereof.

For example, in the above embodiment, the display device 100 has been explained as an example where a user views an image displayed on the display device 100 through the shutter glasses 200 and perceives the image as a stereoscopic image. However, the present disclosure is not limited to such an example. Likewise, the present disclosure can also be applied to a display device where a user directly views an image displayed on the display device 100 and recognizes the image as a stereoscopic image.

For example, in the above embodiment, the video signal control unit 120 receives both of the right eye video signal and the left eye video signal. Alternatively, when a right eye video signal and a left eye video signal are generated through rendering, the drawing processing does not have to be performed twice on the basis of the right and left viewpoint positions, and the drawing processing may be performed on the basis of only one viewpoint or a middle point of the right and left viewpoint positions, so that the same image may be displayed for both eyes when a planar image is displayed.

For example, when the present disclosure is applied to an electronic device capable of displaying a stereoscopic video such as a television receiver and a portable terminal, a user will feel less strain in a selection screen showing a plurality of stereoscopic images such as a cover flow and thumbnails. When a two screen simultaneous display mode is used in a three-dimensional television and the like, a primary screen may be displayed in a stereoscopic display mode, and a secondary screen may be displayed in a planar display mode, so that this configuration improves the ease of view on the screen and reduces the strain put on the eyes of the viewer. Further, the same effects can also be obtained from electronic advertisement and electronic billboard using a display.

When parallax is given to an image itself displayed as a planar image, the target image itself is displayed in a protruding manner. The same effects can also be obtained when the present disclosure is applied to this case. The present disclosure provides the same effects that can be obtained from a method for adjusting stereoscopic effect, i.e., a method for showing completely the same image to the right and left eyes by reducing the above parallax by eliminating parallax of the image itself. Another method for adjusting stereoscopic effect includes a method for adding a frame to an image. In this method, the frame is added to the image itself, whereby it is easy to recognize the depth of the image, which allows a viewer to feel stereoscopic effect more significantly. For this reason, the stereoscopic effect is adjusted by individually turning on/off the frames in a central image and the other images, thus reducing the strain put on the viewer.

The present disclosure contains subject matter related to that disclosed in Japanese Priority Patent Application JP 2010-198981 filed in the Japan Patent Office on Sep. 6, 2010, the entire content of which is hereby incorporated by reference.

What is claimed is:

1. An image processing apparatus comprising:
   at least one processor configured to:
      recognize an operation signal of at least one of head tracking of a user and eye tracking of the user representing a gaze point of the user;
      identify a first image as a focused image and a second image as a non-focused image in response to an event when a movement of the gaze point indicates moving-over the first image, the moving-over of the gaze point being performed before selecting the first image as the identified focused image, the second image being an image other than the first image;
      draw the identified focused image and the identified non-focused image using an adjustment of a left eye image and a right eye image, the drawn focused image comprising a higher stereoscopic effect than that of the drawn non-focused image; and
      send a display signal of the drawn focused image and the drawn non-focused image to an image display unit.

2. The image processing apparatus according to claim 1, wherein the drawn non-focused image is a planar image comprising no stereoscopic effect.

3. The image processing apparatus according to claim 2, wherein the at least one processor is further configured to:
   draw the planar image based on only the left eye image in a case when the planar image is located on a right side with respect to a center of a screen; and
   draw the planar image based on only the right eye image is a case when the planar image is located on a left side with respect to the center of the screen.

4. The image processing apparatus according to claim 1, wherein the stereoscopic effect is achieved with a binocular parallax comprising an amount of displacement between the left eye image and the right eye image.

5. The image processing apparatus according to claim 1, wherein the at least one processor is further configured to send the display signal to the image display unit to display only the drawn focused image as a stereoscopic image and the other images, each of which corresponds to the drawn non-focused image, as non-stereoscopic images.

6. The image processing apparatus according to claim 1, wherein the at least one processor is further configured to:

identify a third image that is substantially adjacent to the first image and is located between the first image and the second image; and send the display signal to the image display unit to display the third image as a stereoscopic effect.

7. An image processing method, implemented via at least one processor, the method comprising:

recognizing an operation signal of at least one of head tracking of a user and eye tracking of the user representing a gaze point of the user;

identifying a first image as a focused image and a second image as a non-focused image in response to an event when a movement of the gaze point indicates moving-over the first image, the moving-over of the gaze point being performed before selecting the first image as the identified focused image, the second image being an image other than the first image;

drawing the identified focused image and the identified non-focused image using an adjustment of a left eye image and a right eye image, the drawn focused image comprising a higher stereoscopic effect than that of the drawn non-focused image; and sending a display signal of the drawn focused image and the drawn non-focused image to an image display unit.

8. The image processing method according to claim 7, further comprising:

drawing the non-focused image as a planar image comprising no stereoscopic effect.

9. The image processing method according to claim 7, wherein the stereoscopic effect is achieved with a binocular parallax comprising an amount of displacement between the left eye image and the right eye image.

10. A non-transitory computer-readable medium having embodied thereon a program, which when executed by a processor of an apparatus causes the processor to perform a method, the method comprising:

recognizing an operation signal of at least one of head tracking of a user and eye tracking of the user representing a gaze point of the user;

identifying a first image as a focused image and a second image as a non-focused image in response to an event when a movement of the gaze point indicates moving-over the first image, the moving-over of the gaze point being performed before selecting the first image as the identified focused image, the second image being an image other than the first image;

drawing the identified focused image and the identified non-focused image using an adjustment of a left eye image and a right eye image, the drawn focused image comprising a higher stereoscopic effect than that of the drawn non-focused image; and sending a display signal of the drawn focused image and the drawn non-focused image to an image display unit.

11. The non-transitory computer-readable medium according to claim 10, wherein the method further comprises:

drawing the non-focused image as a planar image comprising no stereoscopic effect.

12. The non-transitory computer-readable medium according to claim 10, wherein the stereoscopic effect is achieved with a binocular parallax comprising an amount of displacement between the left eye image and the right eye image.

* * * * *